United States Patent
Yeh

(10) Patent No.: US 12,086,419 B2
(45) Date of Patent: Sep. 10, 2024

(54) PARTIAL ERASING MANAGEMENT METHOD, MEMORY STORAGE DEVICE, AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 51 days.

(21) Appl. No.: 17/866,569

(22) Filed: Jul. 18, 2022

(65) Prior Publication Data

US 2024/0004554 A1   Jan. 4, 2024

(30) Foreign Application Priority Data

Jun. 30, 2022   (TW) .................................. 111124588

(51) Int. Cl.
*G06F 3/06*   (2006.01)

(52) U.S. Cl.
CPC .......... *G06F 3/0616* (2013.01); *G06F 3/0652* (2013.01); *G06F 3/0679* (2013.01)

(58) Field of Classification Search
CPC ..... G06F 3/0616; G06F 3/0652; G06F 3/0679
See application file for complete search history.

(56) References Cited

U.S. PATENT DOCUMENTS

| | | | | |
|---|---|---|---|---|
| 11,804,268 | B2* | 10/2023 | Park | G11C 16/10 |
| 2009/0327585 | A1* | 12/2009 | Yeh | G06F 12/0246 |
| | | | | 711/E12.008 |
| 2012/0110249 | A1* | 5/2012 | Jeong | G06F 3/0652 |
| | | | | 711/E12.008 |
| 2015/0212935 | A1* | 7/2015 | Roeder | G06F 12/0246 |
| | | | | 711/103 |
| 2019/0286556 | A1* | 9/2019 | You | G06F 12/0246 |
| 2019/0317673 | A1* | 10/2019 | Tan | G06F 3/0652 |
| 2020/0075103 | A1* | 3/2020 | Lee | G11C 16/0483 |
| 2021/0334203 | A1* | 10/2021 | Helmick | G06F 12/1054 |
| 2022/0076759 | A1* | 3/2022 | Park | G11C 16/0483 |

\* cited by examiner

*Primary Examiner* — Tasnima Matin
(74) *Attorney, Agent, or Firm* — JCIPRNET

(57) ABSTRACT

A partial erasing management method, a memory storage device, and a memory control circuit unit are provided. The method includes: performing a first partial erasing operation on a first physical region among multiple physical regions in a first physical erasing unit to erase first data in the first physical region; after performing the first partial erasing operation on the first physical region, performing a first programming operation on the first physical region to store second data into the first physical region; and in response to at least one of the first partial erasing operation and the first programming operation, updating first status information related to the first physical region.

30 Claims, 14 Drawing Sheets

«PARTIAL ERASING MANAGEMENT METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 111124588, filed on Jun. 30, 2022. The entirety of the above-mentioned patent application is hereby incorporated by reference herein and made a part of this specification.

BACKGROUND

Technical Field

The disclosure relates to a memory management technology, and more particularly to a partial erasing management method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into the various portable electronic devices exemplified above.

Traditionally, an erasing operation performed in the rewritable non-volatile memory module is based on one or more physical blocks as the basic unit for erasure. However, such an erasing manner lacks flexibility in use. In addition, although some types of memory devices support partial erasure of physical blocks, the relevant management mechanism is not complete, which reduces the stability of the system for performing partial erasure.

SUMMARY

The disclosure provides a partial erasing management method, a memory storage device, and a memory control circuit unit, which can improve the management efficiency of a physical unit supporting partial erasure.

An exemplary embodiment of the disclosure provides a partial erasing management method for a rewritable non-volatile memory module. The rewritable non-volatile memory module includes multiple physical erasing units. The physical erasing units include a first physical erasing unit. The partial erasing management method includes the following steps. A first partial erasing operation is performed on a first physical region among multiple physical regions in the first physical erasing unit to erase first data in the first physical region. The physical regions are sequentially used based on a preset order. After performing the first partial erasing operation on the first physical region, a first programming operation is performed on the first physical region to store second data into the first physical region. In response to at least one of the first partial erasing operation and the first programming operation, first status information related to the first physical region is updated.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple physical erasing units. The physical erasing units include a first physical erasing unit. The memory control circuit unit is coupled to the connection interface unit and the rewritable non-volatile memory module. The memory control circuit unit is used to perform the following. A first partial erasing operation is instructed to be performed on a first physical region among multiple physical regions in the first physical erasing unit to erase first data in the first physical region. The physical regions are sequentially used based on a preset order. After performing the first partial erasing operation on the first physical region, a first programming operation is instructed to be performed on the first physical region to store second data into the first physical region. In response to at least one of the first partial erasing operation and the first programming operation, first status information related to the first physical region is updated.

An exemplary embodiment of the disclosure further provides a memory control circuit unit, which is used to control a rewritable non-volatile memory module. The rewritable non-volatile memory module includes multiple physical erasing units. The physical erasing units include a first physical erasing unit. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used to perform the following. A first partial erasing operation is instructed to be performed on a first physical region among multiple physical regions in the first physical erasing unit to erase first data in the first physical region. The physical regions are sequentially used based on a preset order. After performing the first partial erasing operation on the first physical region, a first programming operation is instructed to be performed on the first physical region to store second data into the first physical region. In response to at least one of the first partial erasing operation and the first programming operation, first status information related to the first physical region is updated.

Based on the above, for the first physical erasing unit supporting partial erasure, after performing the first partial erasing operation on the first physical region in the first physical erasing unit to erase the first data, the first programming operation may continue to be performed on the first physical region to write the second data. In particular, in response to the first partial erasing operation and/or the first programming operation, the first status information related to the first physical region may be updated. Thereafter, the management efficiency of the partial erasing mechanism of the first physical erasing unit can be improved through the first status information.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
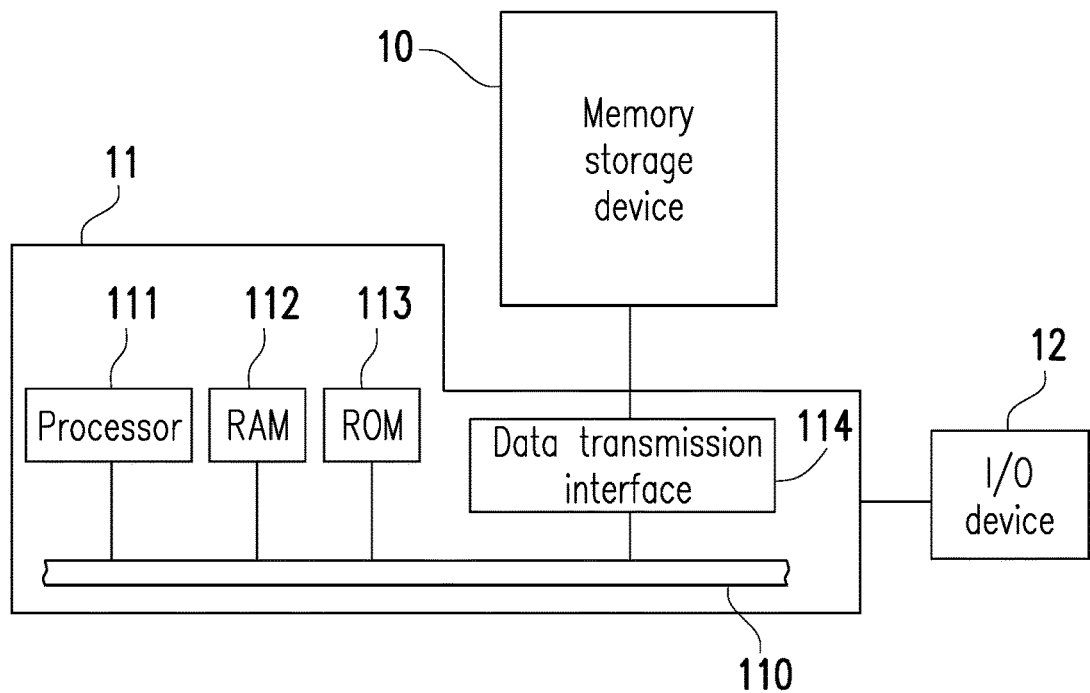
FIG. 1 is a schematic diagram of a host system, a memory storage device, and an input/output (I/O) device according to an exemplary embodiment of the disclosure.
Figure 2:
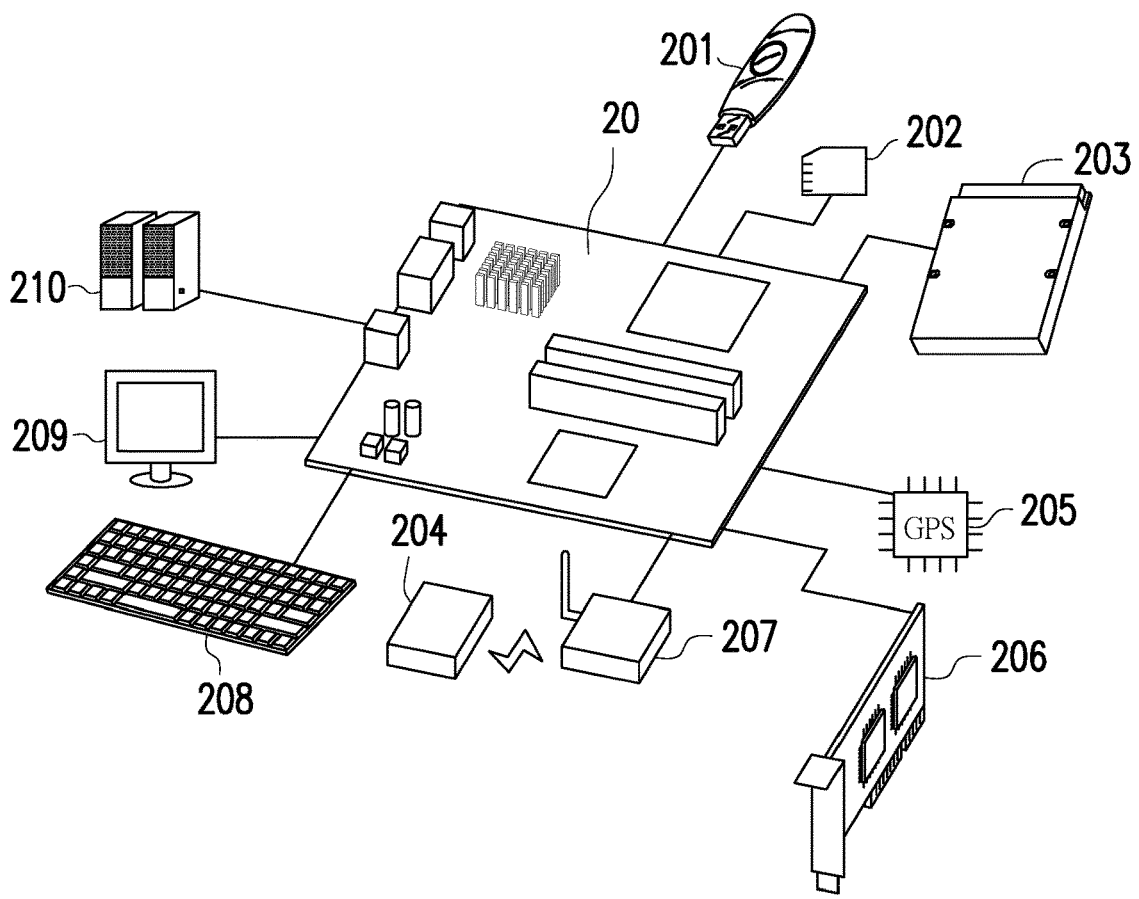
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data into the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
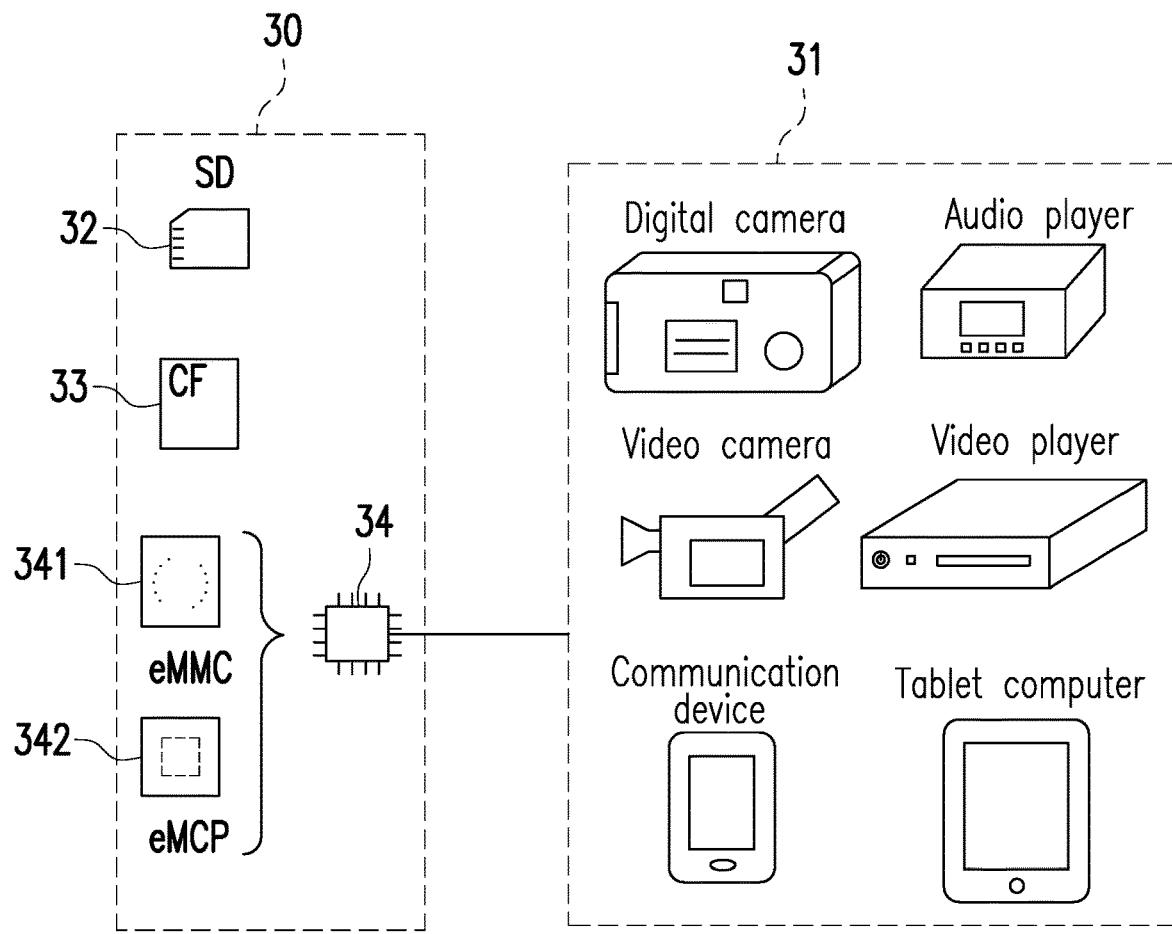
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
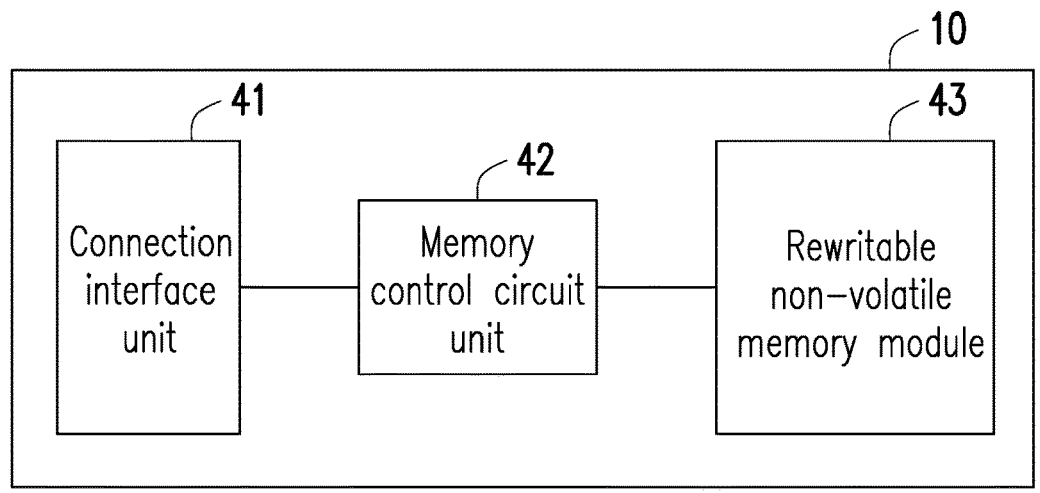
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
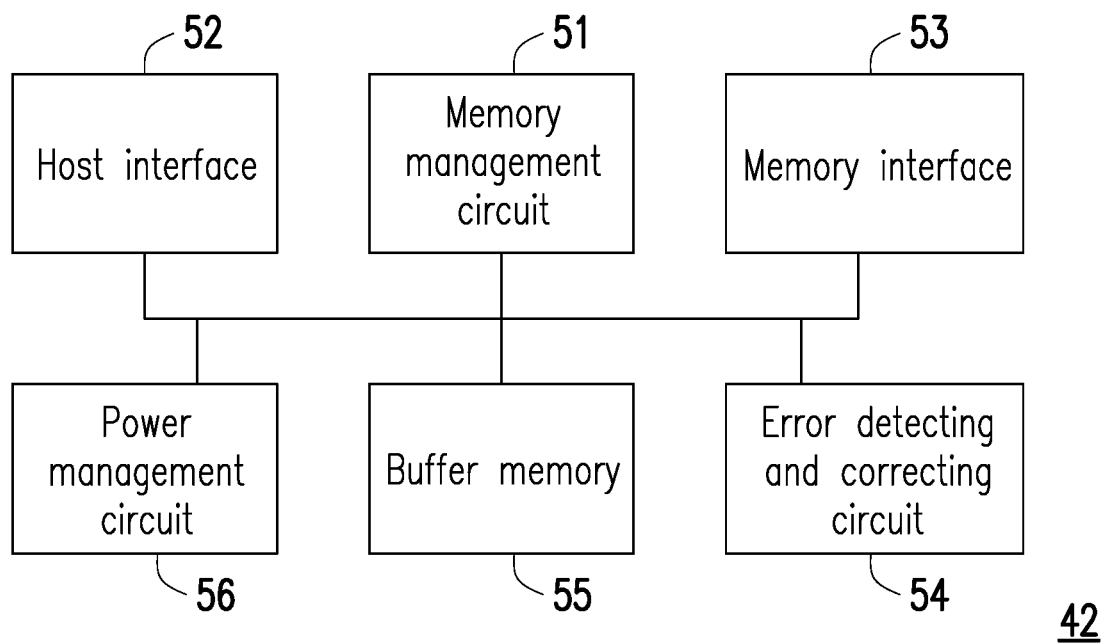
FIG. 5 is a schematic diagram of a memory control circuit unit according to an exemplary embodiment of the disclosure.

FIG. 5 is a schematic diagram of a memory control circuit unit according to an exemplary embodiment of the disclosure.

Please refer to FIG. 5. The memory control circuit unit 42 includes a memory management circuit 51, a host interface 52, and a memory interface 53. The memory management circuit 51 is used to control the overall operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In an exemplary embodiment, the control commands of the memory management circuit 51 may also be stored into a specific region (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, performing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to perform error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 will perform error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
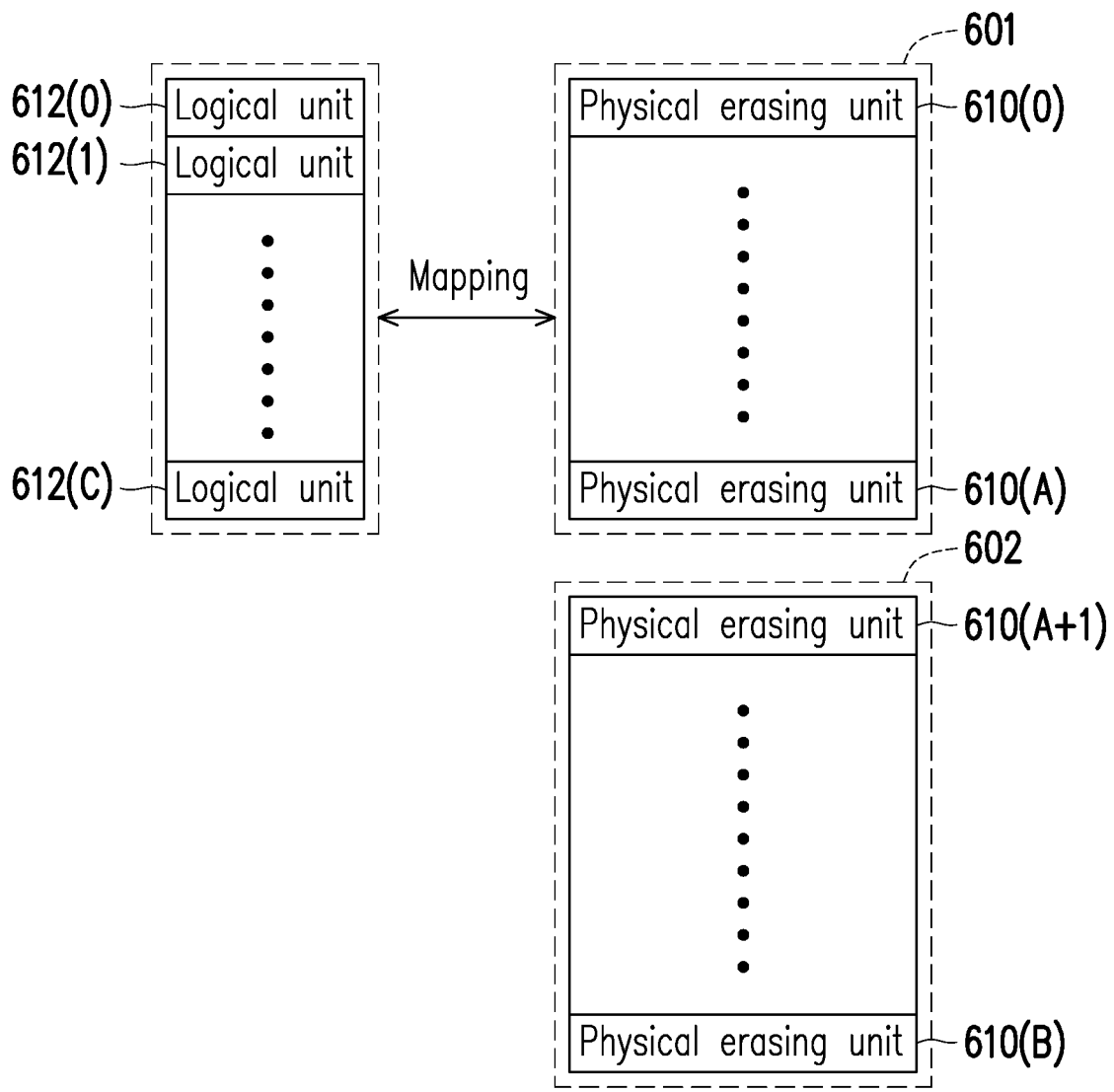
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. The memory management circuit 51 may logically group physical erasing units 610(0) to 610(B) in the rewritable non-volatile memory module 43 into a storage area 601 and a spare area 602. Each physical erasing unit may include multiple physical programming units.

The physical erasing units 610(0) to 610(A) in the storage area 601 are used to store user data (for example, the user data from the host system 11 of FIG. 1). For example, the physical erasing units 610(0) to 610(A) in the storage area 601 may store valid data and invalid data. The physical erasing units 610(A+1) to 610(B) in the spare area 602 do not store data (for example, valid data). For example, if a certain physical erasing unit does not store valid data, the physical erasing unit may be associated (or added) to the spare area 602. In addition, the physical erasing units (or physical units that do not store valid data) in the spare area 602 may be erased. When writing new data, one or more physical erasing units may be extracted from the spare area 602 to store the new data. In an exemplary embodiment, the spare area 602 is also referred to as a free pool.

The memory management circuit 51 may be configured with logical units 612(0) to 612(C) to map the physical erasing units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or non-continuous logical addresses.

It should be noted that one logical unit may be mapped to one or more physical erasing units. If a certain physical erasing unit is currently mapped by a certain logical unit, it means that data currently stored in the physical erasing unit includes valid data. Conversely, if a certain physical erasing unit is not currently mapped by any logical unit, it means that data currently stored in the physical erasing unit is invalid data.

The memory management circuit 51 may record management data (also referred to as logical-to-physical mapping information) describing a mapping relationship between the logical unit and the physical erasing unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

In an exemplary embodiment, at least part of the physical erasing units in the rewritable non-volatile memory module 43 support partial erasure. In particular, for a certain physical erasing unit supporting partial erasure, multiple physical regions in the physical erasing unit are sequentially used based on a preset order.

Figure 7:
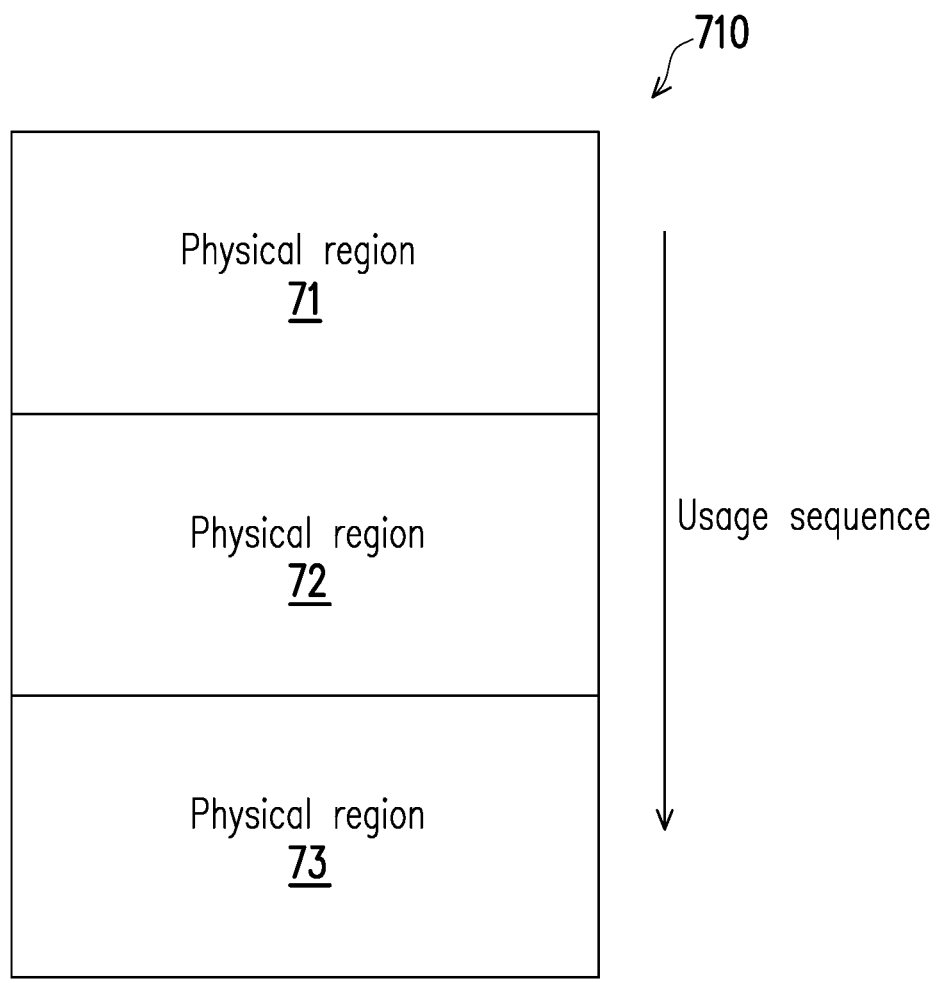
FIG. 7 is a schematic diagram of multiple physical regions in a physical erasing unit and a usage sequence thereof according to an exemplary embodiment of the disclosure.

FIG. 7 is a schematic diagram of multiple physical regions in a physical erasing unit and a usage sequence thereof according to an exemplary embodiment of the disclosure.

Please refer to FIG. 7. It is assumed that the physical erasing units 610(0) to 610(B) of FIG. 6 include a physical erasing unit 710, and the physical erasing unit 710 supports partial erasure. The physical erasing unit 710 includes physical regions 71 to 73. The physical regions 71 to 73 respectively include multiple physical programming units in the physical erasing unit 710. That is, the physical programming units in the physical erasing unit 710 may be logically grouped into the physical regions 71 to 73. In particular, the physical regions 71 to 73 are sequentially used based on a preset order. For example, the physical regions 71 to 73 may only be sequentially used according to the direction of the arrow in FIG. 7, so that the physical regions 71 to 73 may be sequentially erased and programmed based on the preset order.

It should be noted that the following exemplary embodiments are all exemplified by one physical erasing unit including 3 physical regions, but the disclosure is not limited thereto. In other exemplary embodiments, one physical erasing unit may also include 2, 4, or other numbers of physical regions, which is not limited by the disclosure.

Figure 8A:
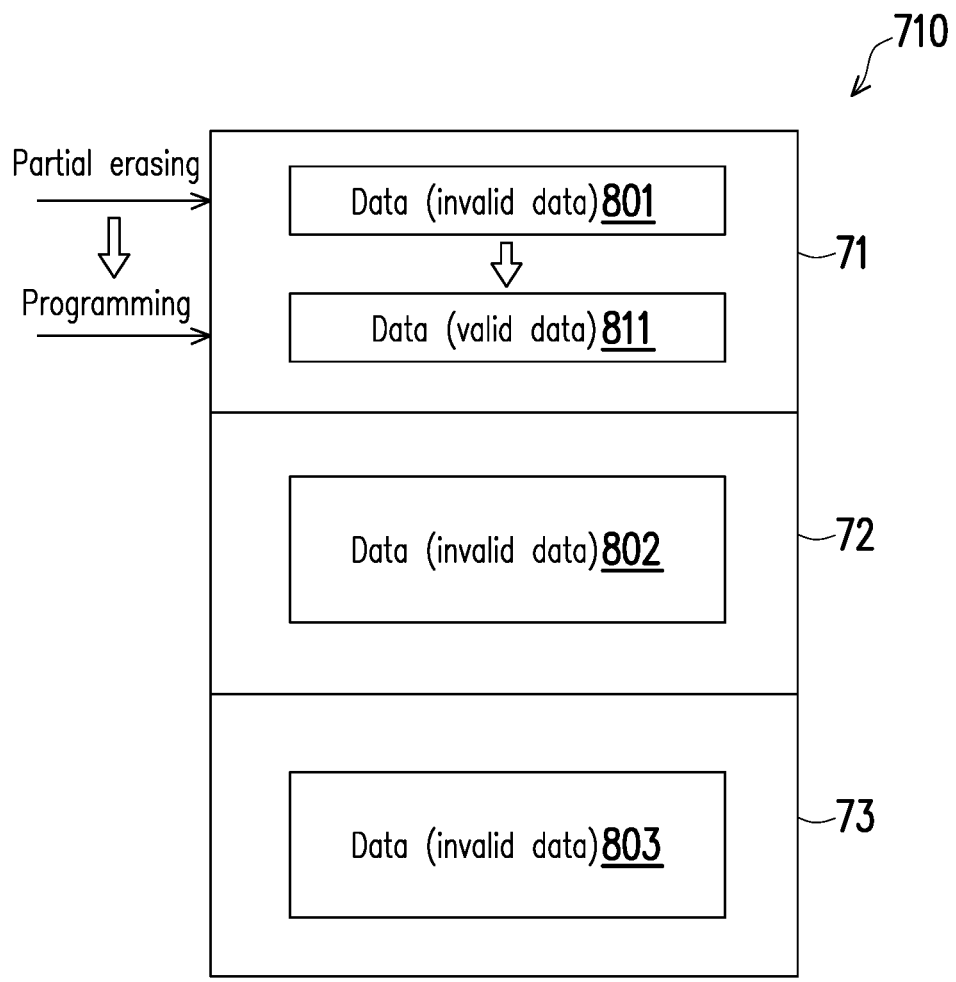
FIG. 8A to FIG. 8C are schematic diagrams of an operating mechanism of partial erasure according to an exemplary embodiment of the disclosure.
Figure 8B:
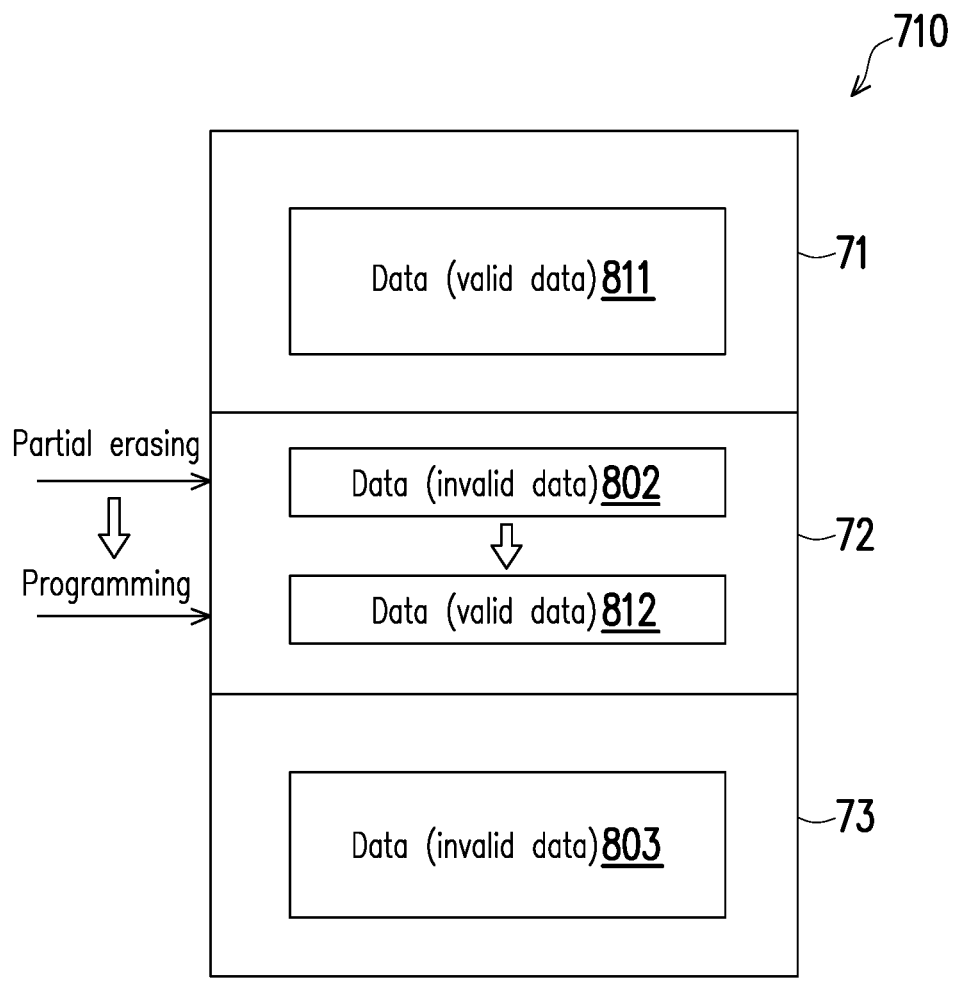
Figure 8C:
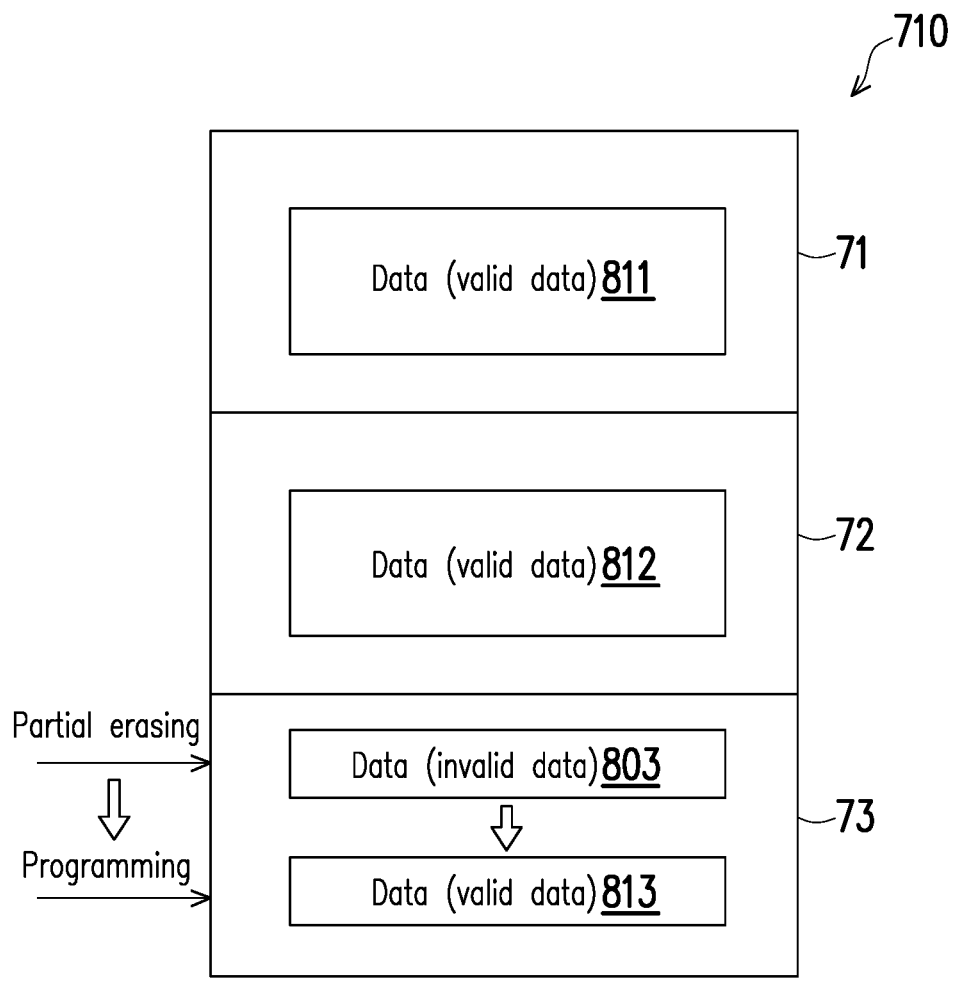

FIG. 8A to FIG. 8C are schematic diagrams of an operating mechanism of partial erasure according to an exemplary embodiment of the disclosure.

Please refer to FIG. 8A. Before activating partial erasure of the physical erasing unit 710, the physical regions 71 to 73 in the physical erasing unit 710 respectively store data 801 to 803. The data 801 to 803 are invalid data.

After activating the partial erasure of the physical erasing unit 710, the memory management circuit 51 may instruct the rewritable non-volatile memory module 43 to perform a partial erasing operation on the physical region 71. The partial erasing operation may be used to erase (for example, clear) the data 801 in the physical region 71. After performing the partial erasing operation on the physical region 71 to erase the data 801, the memory management circuit 51 may instruct the rewritable non-volatile memory module 43 to continue to perform a programming operation on the physical region 71. The programming operation may be used to store data 811 into the physical region 71. The data 811 is valid data. It should be noted that after performing the partial erasing and programming operations on the physical region 71 to write the data 811, data 802 and 803 to be erased are still stored in the physical regions 72 and 73.

Please refer to FIG. 8B. Following FIG. 8A, after performing the partial erasing and programming operations on the physical region 71 to store the data 811, the memory management circuit 51 may instruct the rewritable non-volatile memory module 43 to perform a partial erasing operation on the physical region 72. The partial erasing operation may be used to erase (for example, clear) the data 802 in the physical region 72. After performing the partial erasing operation on the physical region 72 to erase the data 802, the memory management circuit 51 may instruct the rewritable non-volatile memory module 43 to continue to perform a programming operation on the physical region 72. The programming operation may be used to store data 812 into the physical region 72. The data 812 is valid data. It should be noted that after performing the partial erasing and programming operations on the physical region 72 to write the data 812, the data 803 to be erased is still stored in the physical region 73.

Please refer to FIG. 8C. Following FIG. 8B, after performing the partial erasing and programming operations on the physical region 72 to store the data 812, the memory management circuit 51 may instruct the rewritable non-volatile memory module 43 to perform a partial erasing operation on the physical region 73. The partial erasing operation may be used to erase (for example, clear) the data 803 in the physical region 73. After performing the partial erasing operation on the physical region 73 to erase the data 803, the memory management circuit 51 may instruct the rewritable non-volatile memory module 43 to continue to perform a programming operation on the physical region 73. The programming operation may be used to store data 813 into the physical region 73. The data 813 is valid data. So far, the old data 801 to 803 (that is, the invalid data) originally stored in the physical erasing unit 710 have been sequentially erased based on the preset order and are respectively replaced by the new data 811 to 813.

It should be noted that according to the exemplary embodiment of FIG. 8A to FIG. 8C, during the period of performing the partial erasure on the physical erasing unit 710, when a certain physical region in the physical erasing unit 710 is in an erasing status, the remaining physical regions in the physical erasing unit 710 cannot be in the erasing status at the same time. Taking FIG. 8A as an example, when the physical region 71 is in the erasing status (that is, when performing the partial erasing operation on the physical region 71), the remaining physical regions 72 and 73 in the physical erasing unit 710 cannot be in the erasing status at the same time, and so on. Similarly, the physical regions 71 to 73 may be sequentially erased.

In an exemplary embodiment, during the period of performing partial erasure on the physical erasing unit 710, at a single time point, only a single physical region in the physical erasing unit 710 can be erased (that is, in the erasing status). Alternatively, from another perspective, during the period of performing partial erasure on the physical erasing unit 710, there cannot be more than two physical regions in the erasing status in the physical erasing unit 710 at the same time.

In an exemplary embodiment, during the period of performing the partial erasure on the physical erasing unit 710, before completing the partial erasing operation and the programming operation of the physical region 71, the memory management circuit 51 suspends or delays the partial erasing operations of the physical regions 72 and 73. After completing the partial erasing operation and the programming operation of the physical region 71, the memory management circuit 51 may allow to continue to perform the partial erasing operation and the programming operation on the physical region 72. By analogy, the physical regions 71 to 73 may be sequentially used.

In the exemplary embodiment of FIG. 8A, in response to the partial erasing operation and/or the programming operation on the physical region 71, the memory management circuit 51 may update status information related to the physical region 71. The status information may reflect the current or latest usage status of the physical region 71. For example, the status information may be stored in the physical region 71 or stored in a specific management table for the memory management circuit 51 to query.

In the exemplary embodiment of FIG. 8B, in response to the partial erasing operation and/or the programming operation on the physical region 72, the memory management circuit 51 may update status information related to the physical region 72. The status information may reflect the current or latest usage status of the physical region 72. For example, the status information may be stored in the physical region 72 or stored in a specific management table for the memory management circuit 51 to query.

In the exemplary embodiment of FIG. 8C, in response to the partial erasing operation and/or the programming operation on the physical region 73, the memory management circuit 51 may update status information related to the physical region 73. The status information may reflect the current or latest usage status of the physical region 73. For example, the status information may be stored in the physical region 73 or stored in a specific management table for the memory management circuit 51 to query.

Figure 9:
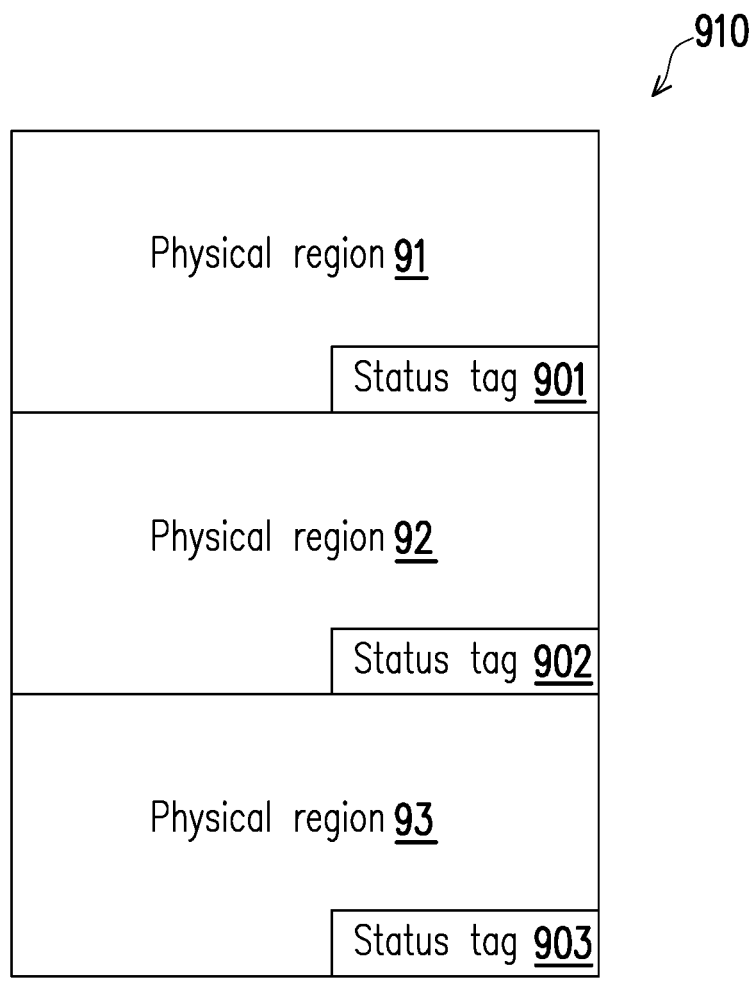
FIG. 9 is a schematic diagram of storing status information into each physical region according to an exemplary embodiment of the disclosure.

FIG. 9 is a schematic diagram of storing status information into each physical region according to an exemplary embodiment of the disclosure.

Please refer to FIG. 9. It is assumed that the physical erasing units 610(0) to 610(B) of FIG. 6 include a physical erasing unit 910, and the physical erasing unit 910 supports partial erasure. Similar to the physical erasing unit 710 of FIG. 7, the physical erasing unit 910 includes physical regions 91 to 93.

A status tag 901 may be stored or configured in a certain physical programming unit in the physical region 91. For example, the status tag 901 may be stored or configured in the last physical programming unit or a spare area of the remaining physical programming units in the physical region 91. In particular, the status tag 901 may be used to store status information related to the physical region 91. For example, in response to a partial erasing operation and/or a programming operation on the physical region 91, the memory management circuit 51 may update the status tag 901 to reflect the latest usage status of the physical region 91.

A status tag 902 may be stored or configured in a certain physical programming unit in the physical region 92. For example, the status tag 902 may be stored or configured in the last physical programming unit or a spare area of the remaining physical programming units in the physical region 92. In particular, the status tag 902 may be used to store status information related to the physical region 92. For example, in response to a partial erasing operation and/or a programming operation on the physical region 92, the memory management circuit 51 may update the status tag 902 to reflect the latest usage status of the physical region 92.

A status tag 903 may be stored or configured in a certain physical programming unit in the physical region 93. For example, the status tag 903 may be stored or configured in the last physical programming unit or a spare area of the remaining physical programming units in the physical region 93. In particular, the status tag 903 may be used to store status information related to the physical region 93. For example, in response to a partial erasing operation and/or a programming operation on the physical region 93, the memory management circuit 51 may update the status tag 903 to reflect the latest usage status of the physical region 93.

FIG. 10A to FIG. 10D are schematic diagrams of updating status information in response to a partial erasing and/or a programming operation according to an exemplary embodiment of the disclosure.

Figure 10A:
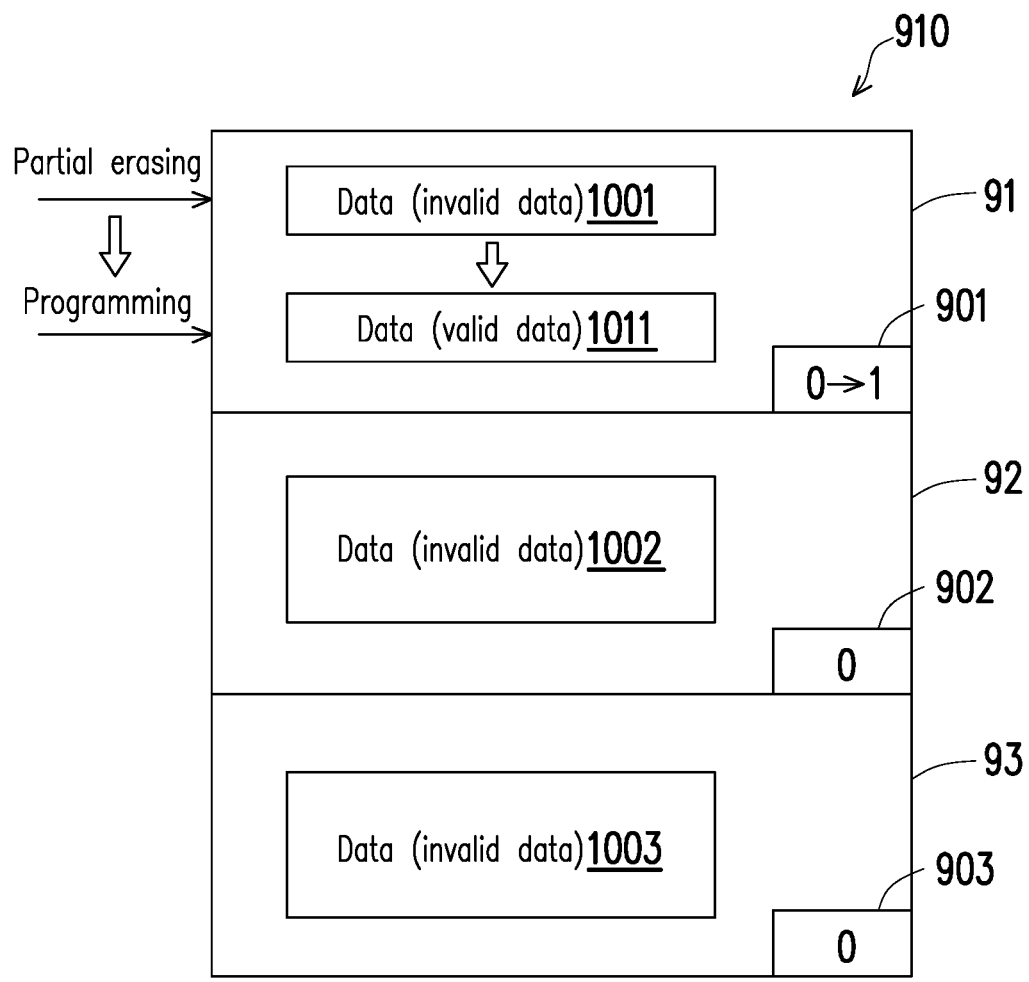
FIG. 10A to FIG. 10D are schematic diagrams of updating status information in response to a partial erasing and/or a programming operation according to an exemplary embodiment of the disclosure.

Please refer to FIG. 10A. Before activating the partial erasure of the physical erasing unit 910, the physical regions 91 to 93 in the physical erasing unit 910 respectively store data 1001 to 1003. The data 1001 to 1003 are invalid data.

After activating the partial erasure of the physical erasing unit 910, the partial erasing operation and the programming operation may be continuously performed on the physical region 91 to erase the old data 1001 in the physical region 91 and store new data 1011 into the physical region 91. The data 1011 is valid data.

In response to the partial erasing operation and/or the programming operation on the physical region 91, the memory management circuit 51 may update the status tag 901 related to the physical region 91. For example, the memory management circuit 51 may update a status bit in the status tag 901 from bit "0" to bit "1" to reflect that the new data 1011 is written to physical region 91. However, in the exemplary embodiment of FIG. 10A, the status tags 902 and 903 are still at bit "0" and are not updated.

Figure 10B:
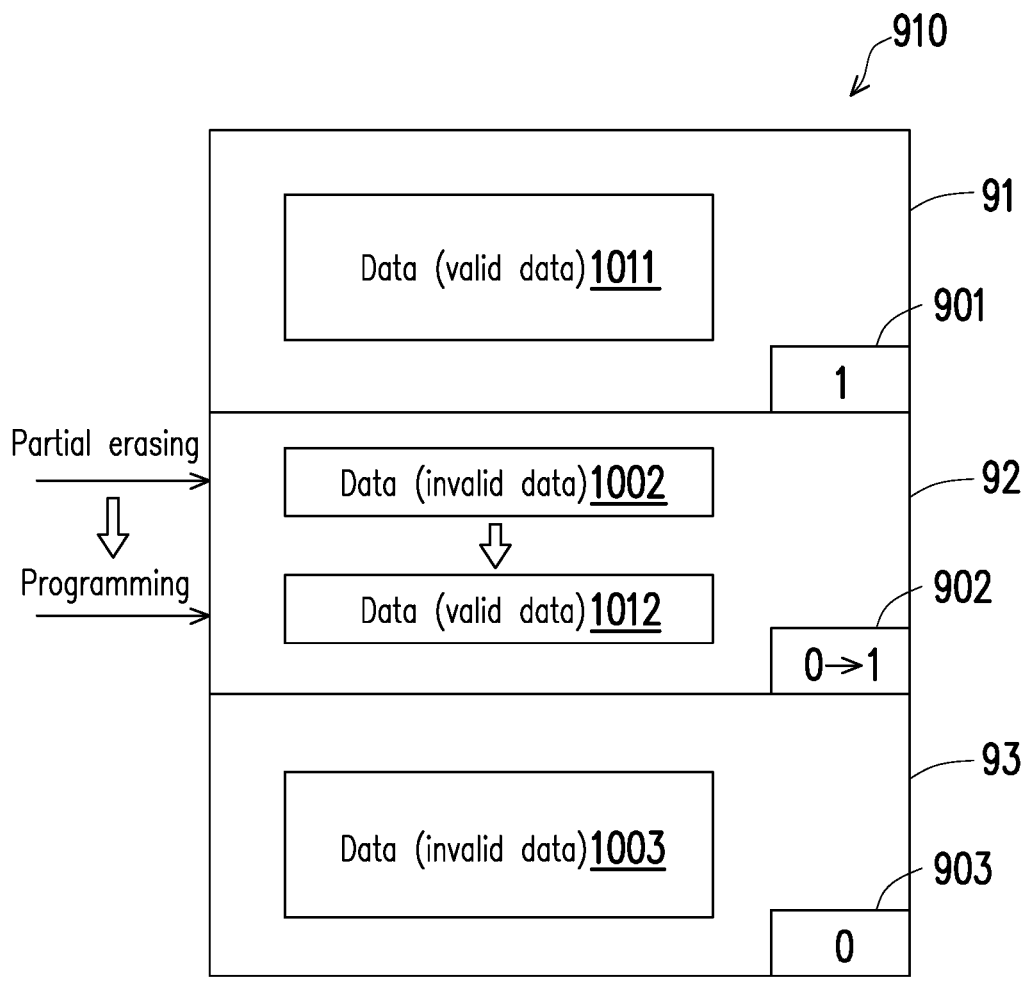

Please refer to FIG. 10B. Following FIG. 10A, after performing the programming operation on the physical region 91 to store the data 1011, the partial erasing operation and the programming operation may be continuously performed on the physical region 92 to erase the old data 1002 in the physical region 92 and store new data 1012 into the physical region 92. The data 1012 is valid data.

In response to the partial erasing operation and/or the programming operation on the physical region 92, the memory management circuit 51 may update the status tag 902 related to the physical region 92. For example, the memory management circuit 51 may update a status bit in the status tag 902 from bit "0" to bit "1" to reflect that the new data 1012 is written to the physical region 92. However, in the exemplary embodiment of FIG. 10B, the status tag 903 is still at bit "0" and is not updated.

Figure 10C:
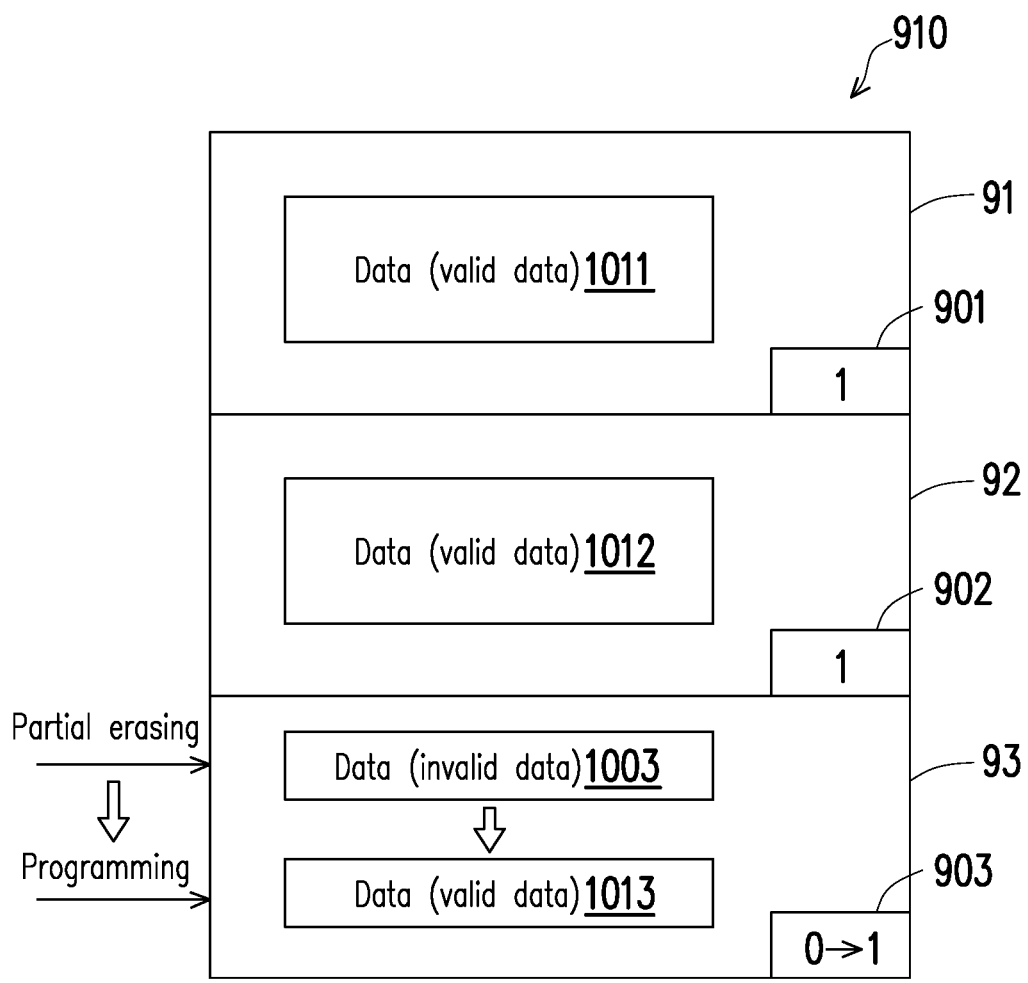

Please refer to FIG. 10C. Following FIG. 10B, after performing the programming operation on the physical region 92 to store the data 1012, the partial erasing operation and the programming operation may be continuously performed on the physical region 93 to erase the old data 1003 in the physical region 93 and store new data 1013 into the physical region 93. The data 1013 is valid data.

In response to the partial erasing operation and/or the programming operation on the physical region 93, the memory management circuit 51 may update the status tag 903 related to the physical region 93. For example, the memory management circuit 51 may update a status bit in the status tag 903 from bit "0" to bit "1" to reflect that the new data 1013 is written to the physical region 93. So far, the status bits in the status tags 901 to 903 are all updated to bit "1" to reflect that the erasure of the entire physical erasing unit 910 is completed and/or the physical regions 91 to 93 all store the same type of data (for example, the valid data).

Figure 10D:
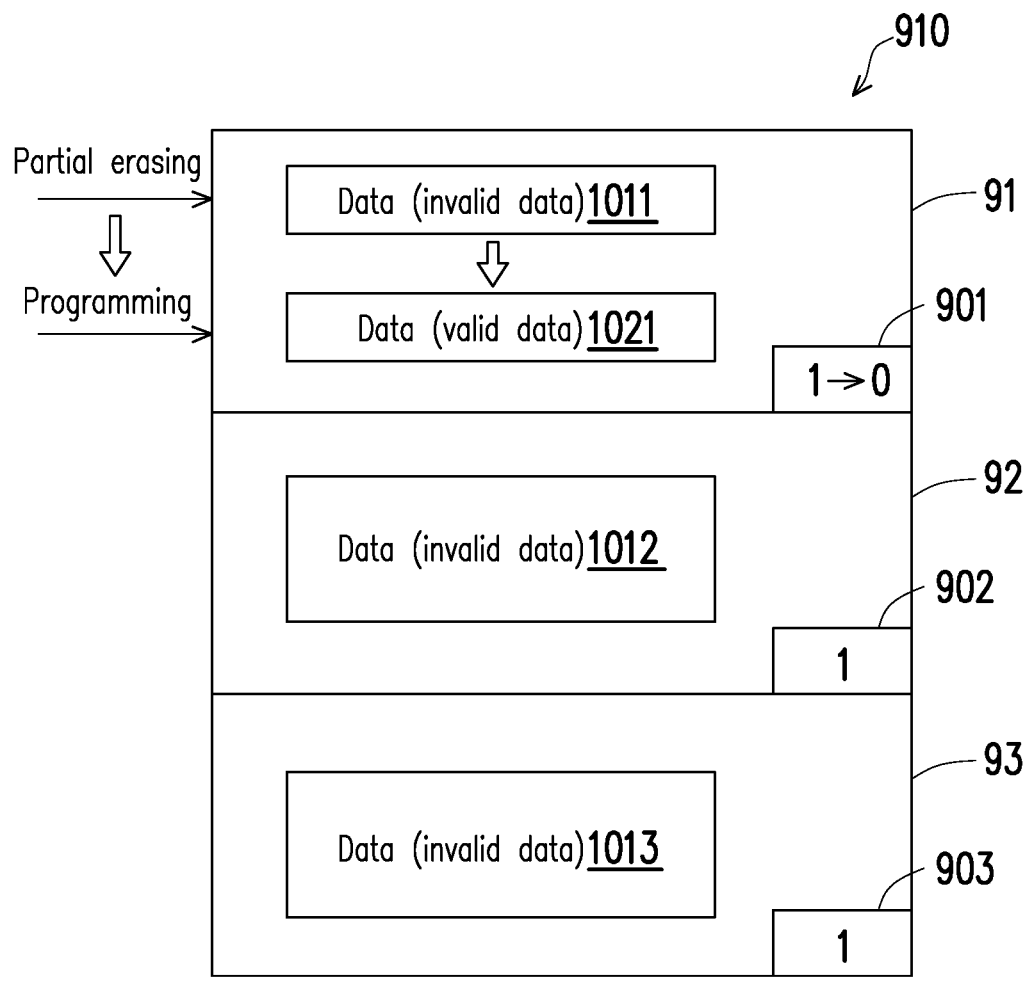

Please refer to FIG. 10D. Following FIG. 10C, it is assumed that after a period of time, the data 1011 to 1013 previously stored in the physical erasing unit 910 are converted into invalid data. Therefore, the memory management circuit 51 may activate the partial erasure of the physical erasing unit 910 again.

After activating the partial erasure of the physical erasing unit 910, the partial erasing operation and the programming operation may be continuously performed on the physical region 91 to erase the old data 1011 in the physical region 91 and store new data 1021 into the physical region 91. The data 1021 is valid data.

In response to the partial erasing operation and/or the programming operation on the physical region 91, the memory management circuit 51 may update the status tag 901 related to the physical region 91. For example, the memory management circuit 51 may update the status bit in the status tag 901 from bit "1" to bit "0" to reflect that the new data 1021 is written to the physical region 91. However, in the exemplary embodiment of FIG. 10D, the status tags 902 and 903 are still at bit "1" and are not updated. By analogy, in response to a partial erasing operation and/or a programming operation on a particular physical region, status information related to the physical region may be updated to reflect the latest usage status of the physical region. The relevant operation details are described above and will not be repeated here.

In an exemplary embodiment, the memory management circuit 51 may obtain the current usage status of one or more physical regions according to the status information. Taking FIG. 10A as an example, the memory management circuit 51 may obtain the current usage statuses of the physical regions 91 to 93 according to the status tags 901 to 903. For example, before updating the status tag 901, the status tags 901 to 903 are respectively bits "0", "0", and "0". Therefore, according to the status tags 901 to 903 (that is, bits "0", "0", and "0"), the memory management circuit 51 may judge that the data currently stored in the physical regions 91 to 93 belong to the same data type. For example, the memory management circuit 51 may judge that the physical regions 91 to 93 all currently store valid data (or invalid data).

However, after updating the status tag 901, the status tags 901 to 903 are respectively bits "1", "0", and "0". Therefore, according to the updated status tags 901 to 903 (that is, bits "1", "0", and "0"), the memory management circuit 51 may judge that the data type of the data currently stored in the physical region 91 is different from the data type of the data currently stored in the physical regions 92 and 93. For example, the memory management circuit 51 may judge that the data currently stored in the physical region 91 is newly written valid data, and the data stored in the physical regions 92 and 93 are invalid data.

By analogy, in the exemplary embodiment of FIG. 10B, after updating the status tag 902, the status tags 901 to 903 are respectively bits "1", "1", and "0". Therefore, according to the updated status tags 901 to 903, the memory management circuit 51 may judge that the data type of the data currently stored in the physical regions 91 and 92 is different from the data type of the data currently stored in the physical region 93. For example, the memory management circuit 51 may judge that the data currently stored in the physical regions 91 and 92 are newly written valid data, and the data currently stored in the physical region 93 is invalid data.

In an exemplary embodiment, it is assumed that during the process of performing a partial erasing operation on a specific physical erasing unit (also referred to as a first physical erasing unit), an unexpected power failure of the memory storage device 10 occurs. After the power is restored, the memory management circuit 51 may obtain the usage status of each physical region in the first physical erasing unit according to the recorded status information related to each physical region.

In an exemplary embodiment, the usage status may reflect a distribution status of valid data and/or invalid data waiting to be erased in the first physical erasing unit. In an exemplary embodiment, the usage status may reflect a distribution status of new data and/or old data in the first physical erasing unit. The new data may include valid data, and the old data may include invalid data. In an exemplary embodiment, first status information may also reflect at least one of an erasing progress and a programming progress of the first physical erasing unit.

Taking FIG. 10A as an example, it is assumed that the power failure occurs after updating the status tag 901. After the power is restored, the memory management circuit 51 may obtain that the current usage statuses of the physical regions 91 to 93 are that the physical region 91 stores the valid data (that is, the new data) and the remaining physical regions 92 and 93 still store the invalid data (that is, the old data) according to the status tags 901 to 903. Alternatively, from another perspective, the memory management circuit 51 may obtain that the erasing progress (and/or the programming progress) of the first physical erasing unit before the power failure is that the partial erasing operation and the programming operation of the physical region 91 are completed (and the physical regions 92 and 93 are not erased) according to the status tags 901 to 903. In this way, after the power is restored, the memory management circuit 51 may start to perform the partial erasing operation and the programming operation from the physical region 92 according to the usage status of each physical region in the first physical erasing unit to gradually complete the erasure and the writing of new data of the entire physical erasing unit 910. The relevant operation details are described above and will not be repeated here. Compared with having to erase and program the entire physical erasing unit again after an unexpected power failure, the exemplary embodiment of the disclosure can effectively improve the management efficiency of the partial erasing mechanism.

In an exemplary embodiment, the unexpected power failure of the memory storage device 10 may result in loss or damage of a part of the management table. Therefore, after the power of the memory storage device 10 is restored, the memory management circuit 51 may reconstruct the mapping table according to the recorded status information related to each physical region. The mapping table may record logical-to-physical mapping information related to second data. For example, the memory management circuit 51 may obtain the usage status of each physical region in the first physical erasing unit according to the recorded status information related to each physical region. Then, the memory management circuit 51 may reconstruct the mapping table according to the usage status. For example, the memory management circuit 51 may reconstruct the mapping table according to the distribution status of the valid data and the invalid data (or the new data and the old data) in the first physical erasing unit.

In an exemplary embodiment, the mapping table may include the logical-to-physical mapping table. The logical-to-physical mapping table may record logical-to-physical mapping information related to at least part of the valid data (including the second data) in the first physical erasing unit. For example, the logical-to-physical mapping information may reflect the mapping relationship between a logical unit and a physical unit (for example, a physical programming unit or a physical erasing unit) to which at least part of the valid data (including the second data) in the first physical erasing unit belongs.

Taking FIG. 10A as an example, it is assumed that the power failure of the memory storage device 10 occurs after updating the status tag 901. After the power is restored, the memory management circuit 51 may reconstruct the mapping table according to mapping information related to the valid data 1011 (that is, the second data) stored in the physical region 91. The mapping information may be stored in the physical region 91, other management tables, or other storage locations. For example, the memory management circuit 51 may add the logical-to-physical mapping information that may reflect the mapping relationship between the logical unit and the physical unit to which the valid data 1011 (that is, the second data) belongs to the mapping table again according to the mapping information.

It should be noted that in the foregoing exemplary embodiments, the status information (for example, the status tags in FIG. 9 and FIG. 10A to FIG. 10D) is only exemplary and is not intended to limit the disclosure. For example, in another exemplary embodiment of FIG. 10D, in response to the partial erasing operation and/or the programming operation on the physical region 91, the memory management circuit 51 may update the status bit in the status tag 901 from bit "1" to bit "2" or other bit values to indicate the latest usage status of the physical region 91. Alternatively, in an exemplary embodiment, the status tag may further contain a status bit in other forms, which is not limited by the disclosure. Alternatively, in an exemplary embodiment, the status information related to each physical region may also be recorded in system information (for example, a customized management table). Then, the memory management circuit 51 may obtain the latest usage status of each physical region in a certain physical erasing unit according to the system information. The relevant operation details are described above and will not be repeated here.

Figure 11:
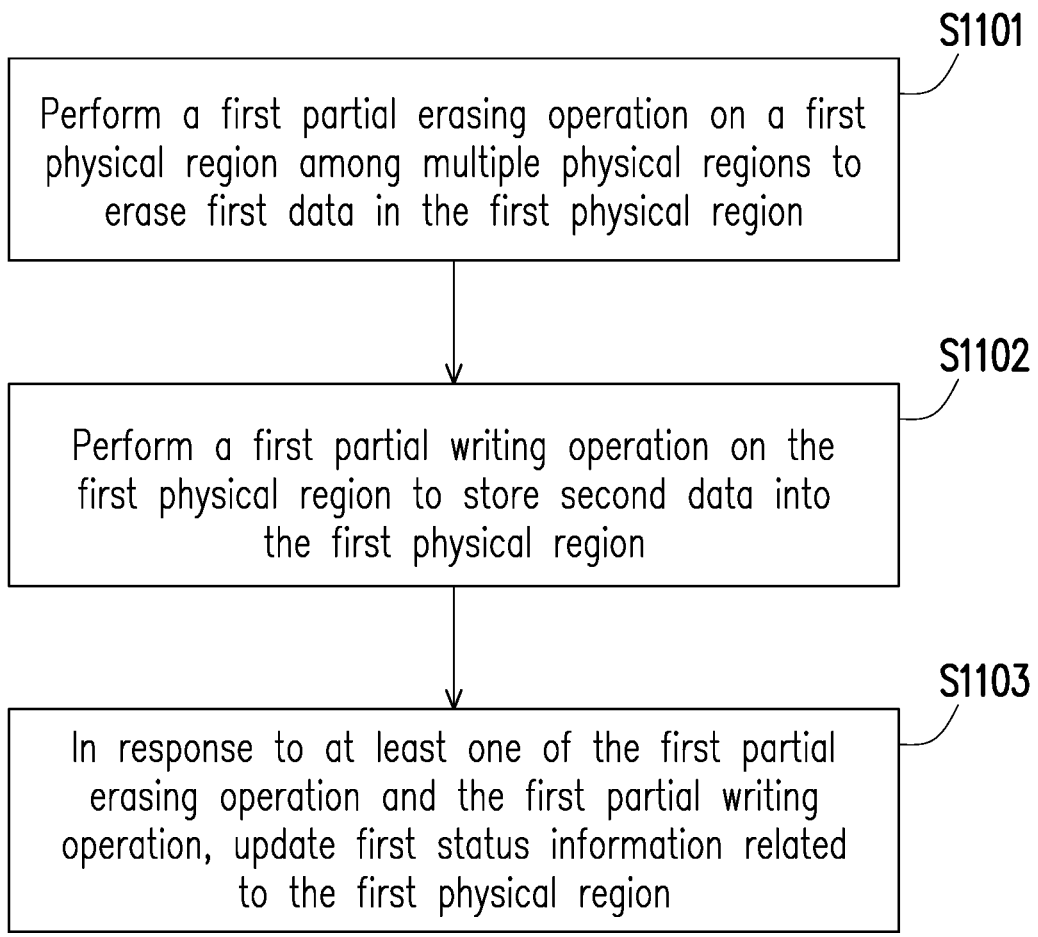
FIG. 11 is a flowchart of a partial erasing management method according to an exemplary embodiment of the disclosure.

FIG. 11 is a flowchart of a partial erasing management method according to an exemplary embodiment of the disclosure.

Please refer to FIG. 11. In Step S1101, a first partial erasing operation is performed on a first physical region among multiple physical regions to erase first data in the first physical region. In Step S1102, a first partial writing operation is performed on the first physical region to store second data into the first physical region. In Step S1103, in response to at least one of the first partial erasing operation and the first partial writing operation, first status information related to the first physical region is updated.

However, each step in FIG. 11 is described in detail as above and will not be repeated here. It is worth noting that each step in FIG. 11 may be implemented as multiple program codes or circuits, which is not limited by the disclosure. In addition, the method of FIG. 11 may be used in conjunction with the above exemplary embodiments or may also be used alone, which is not limited by the disclosure.

In summary, in the exemplary embodiments of the disclosure, the corresponding status information may be updated according to the latest usage status of each physical region in the same physical erasing unit. Thereafter, the status information may be used to determine which physical region in the physical erasing unit to use next (for example, to perform partial erasure on which physical region in the physical erasing unit). In particular, during the period of performing partial erasure on a specific physical erasing unit, if an unexpected power failure occurs, after the power of the device is restored, the status information may be used to quickly restore the usage status of the physical erasing unit before the power failure, which can effectively improve the management efficiency of the partial erasing mechanism.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A partial erasing management method for a rewritable non-volatile memory module, wherein the rewritable non-volatile memory module comprises a plurality of physical erasing units, and the physical erasing units comprise a first physical erasing unit, the partial erasing management method comprising:
    performing a first partial erasing operation on a first physical region among a plurality of physical regions in the first physical erasing unit to erase first data in the first physical region, wherein the physical regions are sequentially used based on a preset order;
    after performing the first partial erasing operation on the first physical region, performing a first programming operation on the first physical region to store second data into the first physical region; and
    in response to at least one of the first partial erasing operation and the first programming operation, updating status information related to the first physical erasing unit, wherein the status information reflects a performing status of at least one partial erasing operation with respect to all of the physical regions in the first physical erasing unit, and the at least one partial erasing operation comprises the first partial erasing operation.

2. The partial erasing management method according to claim 1, wherein when the first physical region is in an erasing status, remaining physical regions among the physical regions are not in the erasing status.

3. The partial erasing management method according to claim 1, wherein after performing the first programming operation on the first physical region, a second physical region among the physical regions still stores third data to be erased.

4. The partial erasing management method according to claim 1, further comprising:
    after performing the first programming operation on the first physical region, performing a second partial erasing operation on a second physical region among the physical regions to erase third data in the second physical region,
    wherein the second physical region is different from the first physical region.

5. The partial erasing management method according to claim 4, further comprising:
   after performing the second partial erasing operation on the second physical region, performing a second programming operation on the second physical region to store fourth data into the second physical region; and
   in response to at least one of the second partial erasing operation and the second programming operation, updating second status information related to the second physical region,
   wherein the updated second status information is same as an updated first status information.

6. The partial erasing management method according to claim 1, wherein sequentially using the physical regions based on the preset order comprises sequentially erasing and programming the physical regions based on the preset order.

7. The partial erasing management method according to claim 1, further comprising:
   obtaining a usage status of the first physical region according to the status information.

8. The partial erasing management method according to claim 1, further comprising:
   reconstructing a mapping table according to the status information, wherein the mapping table records logical-to-physical mapping information related to the second data.

9. The partial erasing management method according to claim 1, further comprising:
   obtaining a distribution status of new data and old data in the first physical erasing unit according to the status information; and
   performing a second partial erasing operation on the old data.

10. The partial erasing management method according to claim 1, wherein the status information reflects at least one of an erasing progress and a programming progress of the first physical erasing unit.

11. A memory storage device, comprising:
    a connection interface unit, used to couple to a host system;
    a rewritable non-volatile memory module, wherein the rewritable non-volatile memory module comprises a plurality of physical erasing units, and the physical erasing units comprise a first physical erasing unit; and
    a memory control circuit unit, coupled to the connection interface unit and the rewritable non-volatile memory module,
    wherein the memory control circuit unit is configured to:
      instruct to perform a first partial erasing operation on a first physical region among a plurality of physical regions in the first physical erasing unit to erase first data in the first physical region, wherein the physical regions are sequentially used based on a preset order;
      after performing the first partial erasing operation on the first physical region, instruct to perform a first programming operation on the first physical region to store second data into the first physical region; and
      in response to at least one of the first partial erasing operation and the first programming operation, update status information related to the first physical erasing unit, wherein the status information reflects a performing status of at least one partial erasing operation with respect to all of the physical regions in the first physical erasing unit, and the at least one partial erasing operation comprises the first partial erasing operation.

12. The memory storage device according to claim 11, wherein when the first physical region is in an erasing status, remaining physical regions among the physical regions are not in the erasing status.

13. The memory storage device according to claim 11, wherein after performing the first programming operation on the first physical region, a second physical region among the physical regions still stores third data to be erased.

14. The memory storage device according to claim 11, wherein the memory control circuit unit is further configured to:
    after performing the first programming operation on the first physical region, instruct to perform a second partial erasing operation on a second physical region among the physical regions to erase third data in the second physical region,
    wherein the second physical region is different from the first physical region.

15. The memory storage device according to claim 14, wherein the memory control circuit unit is further configured to:
    after performing the second partial erasing operation on the second physical region, instruct to perform a second programming operation on the second physical region to store fourth data into the second physical region; and
    in response to at least one of the second partial erasing operation and the second programming operation, update second status information related to the second physical region,
    wherein the updated second status information is same as an updated first status information.

16. The memory storage device according to claim 11, wherein sequentially using the physical regions based on the preset order comprises sequentially erasing and programming the physical regions based on the preset order.

17. The memory storage device according to claim 11, wherein the memory control circuit unit is further configured to:
    obtain a usage status of the first physical region according to the status information.

18. The memory storage device according to claim 11, wherein the memory control circuit unit is further configured to:
    reconstruct a mapping table according to the status information, wherein the mapping table records logical-to-physical mapping information related to the second data.

19. The memory storage device according to claim 11, wherein the memory control circuit unit is further configured to:
    obtain a distribution status of new data and old data in the first physical erasing unit according to the status information; and
    perform a second partial erasing operation on the old data.

20. The memory storage device according to claim 11, wherein the status information reflects at least one of an erasing progress and a programming progress of the first physical erasing unit.

21. A memory control circuit unit for controlling a rewritable non-volatile memory module, wherein the rewritable non-volatile memory module comprises a plurality of physical erasing units, and the physical erasing units comprise a first physical erasing unit, the memory control circuit unit comprising:
    a host interface, used to couple to a host system;
    a memory interface, used to couple to the rewritable non-volatile memory module; and a memory management circuit, coupled to the host interface and the memory interface,
wherein the memory management circuit is configured to:
instruct to perform a first partial erasing operation on a first physical region among a plurality of physical regions in the first physical erasing unit to erase first data in the first physical region, wherein the physical regions are sequentially used based on a preset order;
after performing the first partial erasing operation on the first physical region, instruct to perform a first programming operation on the first physical region to store second data into the first physical region; and
in response to at least one of the first partial erasing operation and the first programming operation, update status information related to the first physical erasing unit, wherein the status information reflects a performing status of at least one partial erasing operation with respect to all of the physical regions in the first physical erasing unit, and the at least one partial erasing operation comprises the first partial erasing operation.

22. The memory control circuit unit according to claim 21, wherein when the first physical region is in an erasing status, remaining physical regions among the physical regions are not in the erasing status.

23. The memory control circuit unit according to claim 21, wherein after performing the first programming operation on the first physical region, a second physical region among the physical regions still stores third data to be erased.

24. The memory control circuit unit according to claim 21, wherein the memory management circuit is further configured to:
after performing the first programming operation on the first physical region, instruct to perform a second partial erasing operation on a second physical region among the physical regions to erase third data in the second physical region,
wherein the second physical region is different from the first physical region.

25. The memory control circuit unit according to claim 24, wherein the memory management circuit is further configured to:
after performing the second partial erasing operation on the second physical region, instruct to perform a second programming operation on the second physical region to store fourth data into the second physical region; and
in response to at least one of the second partial erasing operation and the second programming operation, update second status information related to the second physical region,
wherein the updated second status information is same as an updated first status information.

26. The memory control circuit unit according to claim 21, wherein sequentially using the physical regions based on the preset order comprises sequentially erasing and programming the physical regions based on the preset order.

27. The memory control circuit unit according to claim 21, wherein the memory management circuit is further configured to:
obtain a usage status of the first physical region according to the status information.

28. The memory control circuit unit according to claim 21, wherein the memory management circuit is further configured to:
reconstruct a mapping table according to the status information, wherein the mapping table records logical-to-physical mapping information related to the second data.

29. The memory control circuit unit according to claim 21, wherein the memory management circuit is further configured to:
obtain a distribution status of new data and old data in the first physical erasing unit according to the status information; and
perform a second partial erasing operation on the old data.

30. The memory control circuit unit according to claim 21, wherein the status information reflects at least one of an erasing progress and a programming progress of the first physical erasing unit.

* * * * *